Sept. 26, 1939.   G. R. BLAKESLEY   2,174,028
ELECTRIC SURFACE HEATING UNIT CONTROL SYSTEM
Filed April 28, 1937
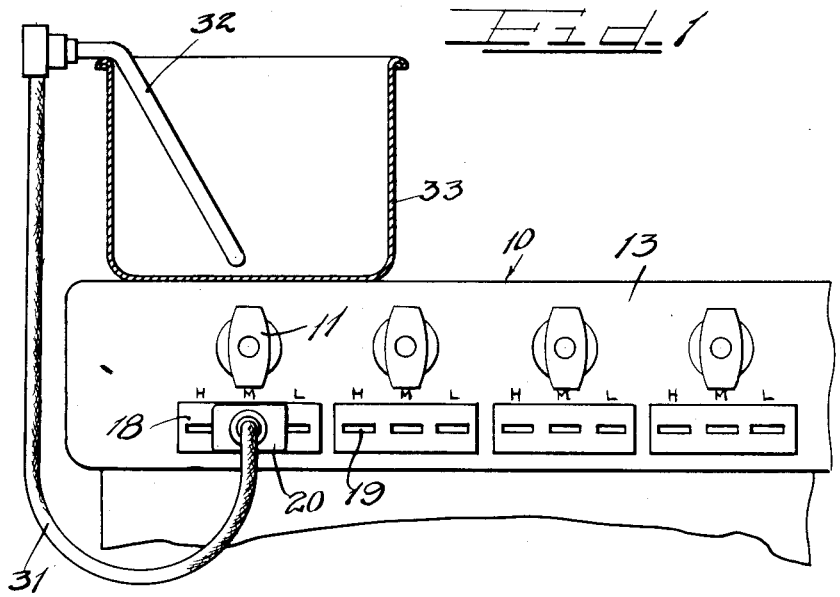
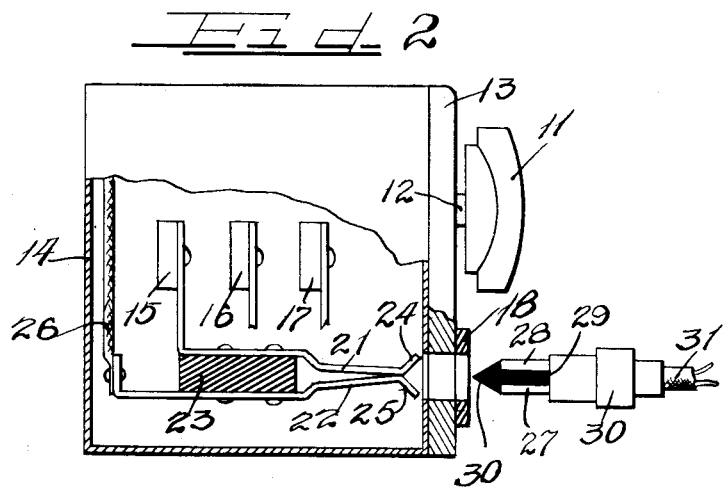
Inventor
George R. Blakesley.
by Charles H. Hill Attys.

Patented Sept. 26, 1939

2,174,028

UNITED STATES PATENT OFFICE 2,174,028

ELECTRIC SURFACE HEATING UNIT CONTROL SYSTEM

George R. Blakesley, Los Angeles, Calif.

Application April 28, 1937, Serial No. 139,362

3 Claims. (Cl. 219—37)

The present invention relates in general to control means for electric burners such as are commonly employed as component parts of a cooking table of a range and the like, and more particularly an electric range, whereby the heat generated by the burner may be controlled in accordance with the amount desired and needed to properly cook food in a cooking utensil placed over the burner.

It has been common practice in the past to control the heat of an oven by the temperature therein and the very desirable and satisfactory results accruing from controls for this purpose have collaborated with other considerations and inspired the present arrangement whereby a similar control may be had over each or any heating element of the cooking table and also, of course, for single and multiple plate burners generally.

The advantages of oven cooking under controlled temperatures have been realized by food authorities who have declared that foods cooked on surface burners should be cooked in a like manner at certain temperatures, some faster at a high degree of heat, while others should be cooked slower at a lower degree of heat. It will, therefore, be evident that in order to make this type of cooking feasible, there should be some form of means for automatically controlling the temperature of the food in the cooking utensils on the surface heating units.

Not only does this type of cooking produce better cooked food, but by automatically controlling the temperature of the foods in the cooking utensils, the cooking operation is performed with better efficiency.

It is well known that any liquid, such as water, will accept a definite number of heat units at a given rate which can be utilized to maintain a boiling temperature while any heat supplied beyond this definite rate and amount merely produces unnecessary evaporation. In cooking food immersed in water, it would therefore seem that if the water is maintained at a boiling temperature without excess boiling, all the heat necessary for cooking is available and that any further or additional rate of heat supply is wasted. Such an excessive heat when evaporating water is not only wasted but requires constant care to replenish the water so evaporated. This illustrates the desirability of controlling temperatures in utensils for a single instance. Manifestly, this desirability could well be discussed from various other angles involving temperatures other than that of the boiling point of water.

It is, therefore, a primary object of the present invention to provide for the control of the supply of heat to a utensil on the cooking table of a range by thermostatic means applicable to different utensils which may be used.

A further object of the invention contemplates the use of a portable thermostat for application to different utensils so that it may be varied in position relative to the burner of the range to suit circumstances, and also so that it may be used where the utensil is located over different burners of the range according to desirability.

Still another object of the invention resides in the provision of suitable means operable by the temperature within a utensil according to a variable predetermined setting to control the rate of heat supplied thereto by the burner underneath.

Still another object is to provide improved means whereby a portable thermostat may be readily connected with the main control switch of a burner and selectively inserted in the switch controlling circuit of the burner depending upon whether the switch is set to effect "high", "medium", or "low" heat operation of the burner.

In accordance with the general features of the invention, it is proposed to provide a portable thermostat which is connected to a connection plug. Associated with each main burner control switch of the table top is a multiple receptacle jack, each receptacle having normally closed contacts which are disposed respectively in the heat control circuit from the switch to the burner unit. For example, a set of contacts would be disposed in the circuit for operating the burner at "high" heat, and similarly contacts would be disposed in the "medium" and "low" circuits to the burner.

With this arrangement, when the jack or plug is not inserted in a receptacle, the main switch may be used to control the burner of the table top in the usual manner. Should it be desired to regulate the temperature at which food in a container over a specific burner is being cooked, it is only necessary to insert the portable thermostat element into the utensil and thereafter insert the plug connection of the thermostat into the proper receptacle, depending upon whether or not the switch is set for "high", "medium", or "low" heat operation of the switch controlling the burner on which the food is being cooked. The thermostat is of conventional construction and preferably is of the type which may be adjusted to operate at various temperatures depending upon the setting of the thermostat mechanism.

Other features and objects of the invention will more fully appear from the following detailed description taken in connection with the accompanying drawing which illustrates a single embodiment thereof, and in which:

Figure 1 is a more or less diagrammatic illustration of a part of the cooking table of an electric range showing the manner of using the invention described herein, and means associated with the main control switches for connecting the thermostat regulating means into the circuit of the switch control means for each burner.

Figure 2 is an enlarged fragmentary view having cut away portions to show the jack and plug arrangement for connecting the thermostat regulating mechanism into the main switch control circuit of the burner.

As shown on the drawing:

Referring first to the arrangement shown in Figure 1, a cooking table 10 of a conventional electric range is illustrated. This table is provided in the usual manner with one or more surface heating units or burners which are normally controlled by means of main circuit switches having control knobs 11 arranged along the front of the cooking table.

Each control switch knob is connected through a suitable operating shaft 12 to the switch mechanism (not shown) which is ordinarily contained behind a front panel of the cooking table as shown at 13 and housed within a suitable housing 14.

The main control switch mechanism may be of any conventional construction, and is usually provided with three terminals, for example, as shown at 15, 16, and 17, which are ordinarily connected by individual conductors to either a two-part heating element or a single heating element having end and central connections. Irrespective of the arrangement of the heating element coils, the heating element is so arranged that the coils may be connected to the supply circuit through the main switch to give a plurality of heating effects, such for example as "high", "medium", and "low".

In the present invention, it is proposed to provide in connection with each main control switch, a multi-receptacle jack. This jack comprises an escutcheon plate 18 which is provided with aligned openings, in this instance three openings, as shown at 19. If desired, these openings may be respectively indicated by the letters "H", "M", and "L" to represent "high", "medium", and "low".

Behind the escutcheon plate, the front panel and housing of the switch are suitably apertured to permit the insertion of a suitable plug 20 into a receptacle of the jack.

In the present invention, each receptacle has associated therein a pair of normally closed spring contacts 21 and 22 which are supported on a suitable insulating member 23 within the switch housing. The contacts 21 and 22 of spring material are deflected at their free ends as shown at 24 and 25 so that when the plug is inserted into the receptacle, these contacts will be spread apart as the plug is moved to seated position.

One of the contacts, contact 21 in this instance, is connected to one of the terminals such as terminal 15 of the switch mechanism, and the other contact, in this instance contact 22, is connected through an appropriate conductor 26 to one terminal of the heating element of the burner.

The plug 20 may be of any conventional construction but is preferably of the type having a pair of spaced contact pieces 27 and 28 which are mounted on either side of an insulating spacer member 29. The ends of the contact pieces and spacer member are bevelled, as shown at 30, to permit the plug to be more easily guided into the receptacle and also to facilitate entrance of the contact pieces between the spring contacts 21 and 22 in the switch housing. It is also desirable to provide the plug with an insulating body portion whereby the plug may be gripped without fear of the operator coming in contact with live parts. The plug is connected through a suitable two-wire conductor 31 to a thermostatic control switch 32 which is preferably of the type which may be adjusted for various temperatures and which contains an elongate portion which is bent intermediate its ends so as to facilitate the disposition of the thermostat into a cooking utensil such as shown at 33.

Each of the other receptacles contains a pair of contacts, such as 21 and 22, which are connected respectively to the switch terminals 16 and 17 in the same manner that connection is made to terminal 15 as described above.

It will be appreciated that, with the above arrangement, the cooking utensil may be utilized for cooking on any desired burner, and depending upon the food which is being cooked, the main control switch may be set to obtain "high", "medium", or "low" heat operation of the particular burner being used. This manner of operation is, of course, the conventional mode of cooking on surface heating units on the table top of the range. With the improved system of the present invention, regulation of the cooking is obtained so as to provide a predetermined temperature in the cooking utensil depending upon the particular food being cooked, by inserting the thermostat into the cooking utensil and the plug 20 into the appropriate receptacle of the switch for the burner being used, depending upon whether the switch is on the "high", "medium", or "low" operating position.

The insertion of the plug 20 into the receptacle will thus place the thermostat 32 in the control circuit from the main control switch to the heating unit and will intermittently open and close the circuit to regulate and maintain the cooking of the food at proper temperature. This arrangement will not only result in the proper cooking of the food, but will in addition prevent waste of heat and consequently inefficient operation of the range burner during the cooking operation.

In the foregoing description, the invention has been described as utilizing a multi-receptacle jack at each of the main control switches. It is not contemplated, however, that the invention shall be thus limited as it will be apparent to one skilled in the art that, in some circuit arrangements, it may be desirable to use a greater or less number of receptacles at each burner control switch.

For example, my Patent No. 1,626,221 discloses an electric heating system in which a common connection from the main control switch remains energized for each operation setting of the main control switch, that is, whether the switch is set for "high", "medium", or "low" heat operation of the burner.

In an arrangement such as described above, it will be obvious that a multi-receptacle jack need not be provided, and that thermostatic regulation for the various heat operation settings of a main control switch may be accomplished by the use of a single receptacle jack placed in the common connection.

From the foregoing description, it will be apparent that the present invention provides an improved electric surface heating unit control system wherein the supply of heat to a cooking utensil on the cooking table of a range may be regulated by thermostatic means applicable to different utensils; which includes a novel plug and jack arrangement associated with the main control switches for the burners in the table top to permit connection of the portable thermostat in the switch circuit to the burner being used; and in which provision is made at each main control switch for inserting the thermostat in the proper circuit depending upon whether the switch is being operated to give "high", "medium", or "low" heat operation of the heating element.

It is, of course, to be understood that although I have described in detail the preferred embodiment of my invention, the invention is not to be thus limited, but only insofar as defined by the scope and spirit of the appended claims.

I claim as my invention:

1. In combination with the cooking table burner of an electric range, a burner control switch for selectively varying the burner circuit connection to give a plurality of different burner heats, a portable thermostat adapted to be associated with a cooking utensil subjected to heat from said burner, a jack having a plurality of sets of normally closed contacts, each set of contacts being disposed in one of said circuit connections, and a plug connection for said thermostat adapted to be operatively associated with any one of said sets of contacts, whereby the thermostat may be connected in the circuit connection selected by said switch.

2. In combination with the cooking table burner of an electric range, a burner control switch for selectively connecting the burner for "high", "medium", and "low" heat operation, a jack having contact receptacles respectively connected in the "high", "medium", and "low" heat connections of said switch, a portable thermostat adapted to be associated with a cooking utensil subjected to heat from said burner, and a single plug connector common to said jack receptacles, said plug being connected to said thermostat, whereby the thermostat may be connected into whichever heating connection is being utilized.

3. In combination with the cooking table burner of an electric range, circuits for energizing said burner to obtain different burner heats, a main control switch arranged for selectively connecting said circuits to a source of energy supply, a portable thermostat adapted to be disposed in a cooking utensil placed in heat receiving relation with said burner, and means for selectively connecting the thermostat in the energizing circuit selected by the main control switch.

GEORGE R. BLAKESLEY.